United States Patent Office 3,203,970
Patented Aug. 31, 1965

3,203,970
ADAMANTANE ISOCYANATE AND ISOTHIOCYANATE
Marvin Paulshock and John C. Watts, Wilmington, Del., assignors to E. I. du Pont de Nemours and Company, Wilmington, Del., a corporation of Delaware
No Drawing. Filed Apr. 19, 1963, Ser. No. 274,325
3 Claims. (Cl. 260—453)

This invention relates to adamantane derivative compounds and more particularly to adamantane isocyanate and adamantane isothiocyanate useful as chemical intermediates.

The adamantane derivatives of the present invention have the formulas

Ad–NCO and Ad–NCS where Ad is the saturated adamantyl nucleus.

The adamantane isocyanate and isothiocyanate of this invention are prepared by reaction of 1-aminoadamantane with phosgene and thiophosgene respectively in a suitable inert organic solvent such as xylene. A slight molar excess of phosgene and thiophosgene is advantageous. Reaction temperatures from about 60° C. to reflux are satisfactory.

Specific illustration of the preparation of the above two compounds is now given by way of further explanation and not limitation.

*Example 1*

One mole of 1-aminoadamantane in one liter of xylene is added dropwise over a period of about 1 hour to a stirred, refluxing solution of 1.05 moles of phosgene in about 750 milliliters of xylene. The temperature rises as the reaction proceeds and the phosgene is reacted. Refluxing is continued for about 30 minutes after the temperature reaches the boiling point of the solvent. Nitrogen is then passed through the mixture to remove traces of HCl and phosgene. Removal of the solvent gives essentially pure 1-isocyanatoadamantane, melting point 143–5° C.

*Example 2*

One mole of 1-aminoadamantane in one liter of toluene is added dropwise over a period of about 1 hour to a stirred solution of 1.05 moles of thiophosgene in about 800 milliliters of toluene at 60° C. After the addition, the temperature is raised slowly to reflux and maintained there for one hour. Removal of solvent gives essentially pure 1-isothiocyanatoadamantane.

The above two compounds of this invention are useful as chemical intermediates in the production of adamantane derivatives having substituted in a bridgehead or 1-position on the adamantane nucleus a carbamic acid radical, a thiocarbamic acid radical, a thionocarbamic acid radical or a dithiocarbamic acid radical. These carbamic acid compounds can be conveniently prepared by reaction of the adamantane isocyanage or isothiocyanate with alcohols or mercaptans in the presence of pyridine under reflux conditions for a period of about 2 hours or longer.

In this manner there can readily be prepared the following compounds:

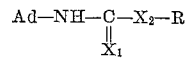

where $X_1$ and $X_2$ are oxygen or sulfur; and R is alkyl of 1 through 4 carbons, phenyl or benzyl.

The aforementioned carbamic acid compounds are useful as antiviral agents and antioxidants.

This application is a continuation-in-part of our copending application Serial No, 134,157, filed August 28, 1961, now abandoned.

The invention claimed is:
1. A compound selected from the group consisting of adamantane isocyanate and adamantane isothiocyanate.
2. Adamantane isocyanate.
3. Adamantane isothiocyanate.

References Cited by the Examiner

FOREIGN PATENTS 499,474    3/51    Belgium.

OTHER REFERENCES

Degering et al.: Organic Nitrogen Compounds, 1950, p. 543, Michigan.

CHARLES B. PARKER, *Primary Examiner.*

IRVING MARCUS, *Examiner.*